July 30, 1929.  W. L. DE BAUFRE  1,722,458
SEPARATION OF MIXED GASES BY PROGRESSIVE SOLUBILITY
Filed June 3, 1924
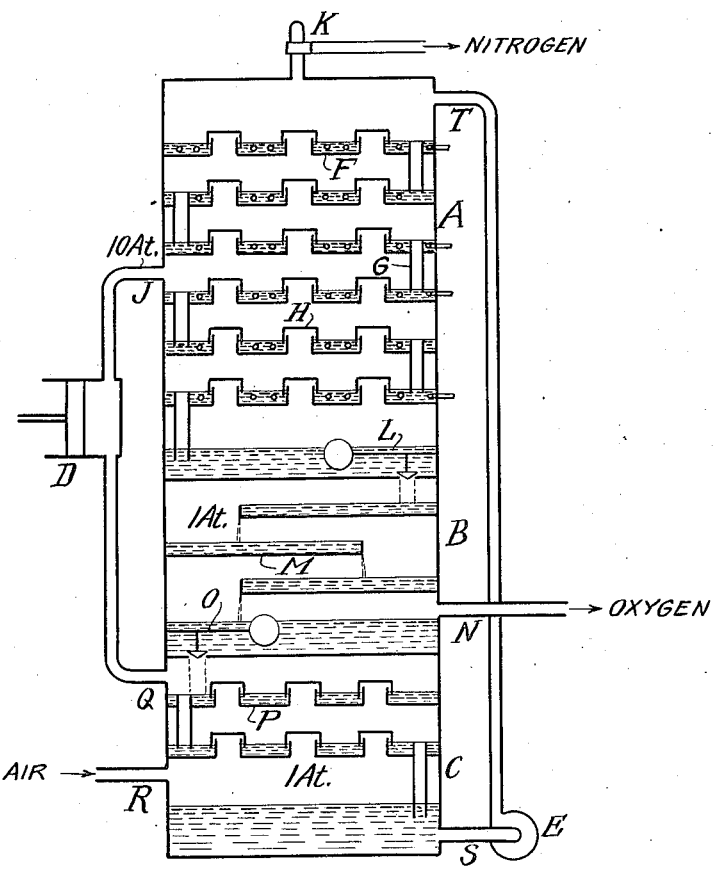
WITNESS
INVENTOR
William L. De Baufre
BY
Synnestvedt + Lechner
ATTORNEYS Patented July 30, 1929.

1,722,458

UNITED STATES PATENT OFFICE.

WILLIAM L. DE BAUFRE, OF LINCOLN, NEBRASKA, ASSIGNOR TO SAMUEL G. ALLEN, TRUSTEE.

SEPARATION OF MIXED GASES BY PROGRESSIVE SOLUBILITY.

Application filed June 3, 1924. Serial No. 717,656.

This invention relates to the separation of air and other mixed gases into their constituents by solubility, and is based upon the following facts:

The quantity of gas taken up by a given volume of solvent is approximately proportional to the absolute pressure.

In a mixture of two gases such as air the amount of each constituent which is dissolved by a given volume of solvent is not proportional to the partial pressure of that constituent, but a preferential solubility exists such that the ratio of the constituents of the gas in solution bears to the ratio of the constituents remaining in gaseous form, a similar relation to that existing between the liquid and gaseous phases of a partly condensed gas.

The invention aims to put these principles into effect for the economic extraction of oxygen, nitrogen, or other constituents of two or more mixed gases.

The process consists essentially in bringing air under pressure into contact with water, or other solvent, in such manner that the solvent is progressively subjected to gas richer and richer in oxygen until finally it is subjected to practically pure oxygen; then in withdrawing the solvent and exposing it to a reduced pressure in order to set free most of the absorbed oxygen. The solvent may be recirculated.

In the drawing I have illustrated in diagrammatic form, an apparatus suitable for carrying out my invention. A vertical vessel consists of three parts—an upper part of column A in which the solvent is brought into contact with the air under pressure, an intermediate part B where the oxygen is set free under reduced pressure, and a lower part C where the incoming air is brought into contact with the solvent from B. A compressor D increases the pressure of the air to that desired in A, say to 10 atmospheres. A pump E raises the solvent from the bottom of C to the top of A for recirculation downward.

Part A of the apparatus contains a number of trays F for the liquid solvent. Overflow pipes G convey the solvent from tray to tray, maintaining a constant liquid level in each tray. Caps H with serrated edges cause the air to bubble through the liquid solvent. The compressed air enters at J and is brought into intimate contact with the solvent in the tray immediately above. Part of the air is absorbed; but as a greater proportion of the oxygen than of the nitrogen is absorbed, the air becomes richer in nitrogen. A sufficient number of trays is provided to give nearly pure nitrogen at the top of A. The automatic relief valve K is set to permit the nitrogen to escape at the pressure it is desired to maintain in A. Cooling coils are provided in these trays to increase the absorbing capacity of the solvent.

The solvent which has absorbed oxygen rich air in the trays above inlet J, flows down through the trays below the inlet. Here the solvent is heated by some convenient means, such as by pipes conveying warm water or steam, to drive off some of the absorbed gases. These gases bubble through the trays above. The nitrogen is more easily driven off than the oxygen, so that the effect is to bring the solvent into contact with gas richer and richer in oxygen. A sufficient number of trays are provided to bring the solvent into contact with practically pure oxygen gas at the bottom of A.

The cooling effect above the entrance J and the heating effect below this point may be produced by means of a refrigeration cycle in which the refrigerant is condensed in coils in the lower trays and evaporated in coils in the upper trays.

The discharge of the solvent from the part A is effected by the float controlled valve L. The solvent then flows over the trays M in part B, where it is subjected to a pressure lower than in part A. This pressure may be atmospheric, or even lower if an exhauster is attached to the oxygen outlet at N. Due to the reduced pressure in B, the absorbed gas is partly set free, the amount remaining depending upon the absolute pressure in B. Since the solvent had been brought into contact with practically pure oxygen before leaving part A practically pure oxygen will be obtained in part B.

Before recirculating the solvent, it is brought into intimate contact with the entering air in part C. The float valve O controls the discharge of solvent from part B to part C. In part C are trays P for the solvent through which the entering air bubbles. The object of this step in the process is to reduce the loss of oxygen which would occur if the solvent from part B were discharged at once into the top of part A. By bringing the solvent into intimate contact with the entering air under reduced pressure, part of the absorbed oxygen remaining after passing through B, is discharged into the entering air and some nitrogen is absorbed. The entering air is thus enriched with oxygen from the solvent, which is consequently capable of producing a purer nitrogen gas in the top of part A to which it is discharged by pump E.

Where a number of constituents are to be separated, a number of these arrangements may be used in series, removing first one and then another of the constituents from the gas under pressure. The nitrogen escaping from the top of the column may be used in an engine to recover some of the power expended in compressing the air originally. In expanding the nitrogen in an engine, it will be cooled and the cool nitrogen may be used to provide the refrigeration required in the upper part of the column.

It will be apparent that by this process the desired constituent may be obtained either by dissolving in the solvent or by dissolving the undesired constituents in which case the desired constituent would be the remainder. It is to be understood that the claims are to be understood as contemplating either course of procedure.

I claim:

1. The process of separation of gaseous mixtures which consists in subjecting a solvent progressively to a gaseous mixture richer and richer in the constituent desired and finally in exposing the solvent to a relatively reduced pressure to free the constituent, and then in subjecting the solvent to the incoming gaseous mixture before recirculation of the solvent.

2. The process of separation of gaseous mixtures which consists in subjecting a solvent progressively to a gaseous mixture richer and richer in the constituent desired and finally in exposing the solvent to a relatively reduced pressure to free the constituent, and then in subjecting the solvent to the incoming gaseous mixture under reduced pressure before recirculation of the solvent.

3. The process of separation of mixed gases which consists in subjecting under pressure a solvent of a different nature from the gaseous mixture progressively to a gaseous mixture richer and richer in the constituent desired while adding heat, and then exposing the solvent to a relatively reduced pressure to release the constituent, the gaseous mixture before being compressed being subjected to the solvent.

4. The process of separation of mixed gases which consists in subjecting under pressure a solvent of a different nature from the gaseous mixture progressively to a gaseous mixture richer and richer in the constituent desired while adding heat, and then exposing the solvent to a relatively reduced pressure to release the constituent, the gaseous mixture before being compressed being subjected to the solvent at the reduced pressure.

5. The process of separation of mixed gases which consists in introducing the gaseous mixture under pressure at an intermediate point in a tray section, in introducing a solvent of a different nature from the gaseous mixture into the upper end of the section to flow out the bottom end, in adding heat below and abstracting heat above the inlet, and in subjecting the solvent to reduced pressure to free the constituent desired.

6. The process of separation of mixed gases which consists in introducing the gaseous mixture under pressure at an intermediate point in a tray section, in introducing a solvent of a different nature from the gaseous mixture into the upper end of the section to flow out the bottom end, in adding heat below and abstracting heat above the inlet, and in subjecting the solvent to reduced pressure to free the constituent desired, the gaseous mixture before compression being subjected to the solvent at the reduced pressure.

In testimony whereof, I have hereunto signed my name.

WM. L. DE BAUFRE.